(12) United States Patent
Kwon et al.

(10) Patent No.: US 6,173,111 B1
(45) Date of Patent: Jan. 9, 2001

(54) CAPSTAN PHASE CONTROL METHOD DURING SLOW PLAYBACK AND SERVO SYSTEM FOR VIDEO CASSETTE RECORDER ADOPTING THE SAME

(75) Inventors: Young-Gi Kwon, Yongin; Jong-Gyu Lee, Kwachun, both of (KR)

(73) Assignee: Samsung Electronics Co., Ltd., Kyungki-Do (KR)

( * ) Notice: Under 35 U.S.C. 154(b), the term of this patent shall be extended for 0 days.

(21) Appl. No.: 09/016,268

(22) Filed: Jan. 30, 1998

(30) Foreign Application Priority Data

Jan. 31, 1997 (KR) .................................................. 97-2937

(51) Int. Cl.[7] .................................................. H04N 5/783
(52) U.S. Cl. .................................. 386/68; 386/79; 386/81
(58) Field of Search .................................. 386/46, 68, 80, 386/81, 67, 78, 7, 79

(56) References Cited

U.S. PATENT DOCUMENTS

| | | | |
|---|---|---|---|
| 4,890,169 | * 12/1989 | Kobayashi et al. | 386/80 |
| 4,910,613 | * 3/1990 | Mabuchi et al. | 386/81 |
| 5,684,916 | * 11/1997 | Hong | 386/68 |
| 5,887,113 | * 3/1999 | Park et al. | 386/81 |

\* cited by examiner

*Primary Examiner*—Huy Nguyen
(74) *Attorney, Agent, or Firm*—Sughrue, Mion, Zinn, Macpeak & Seas, PLLC

(57) ABSTRACT

A capstan phase control method during slow playback and the servo system of a VCR adopting the same, for phase-controlling a capstan motor so that a slow motion picture can be viewed without having noise during slow playback of the VCR. The capstan phase control method and the servo system employing the same, sets a sampling frequency of a reference control signal corresponding to desired slow playback on the basis of a head switching signal, judges whether a phase of the reference control signal having the set sampling frequency is identical with that of the control signal read via a head from the tape, and controls the phase of the capstan motor so that the phase of the read control signal is identical with that of the reference control signal on the basis of the judgement result. Accordingly, since the capstan motor can be phase-controlled and speed-controlled during slow playback, a tracking control can be performed so that noise does not appear on a screen. Thus, a slow motion picture without having noise can be provided.

19 Claims, 6 Drawing Sheets

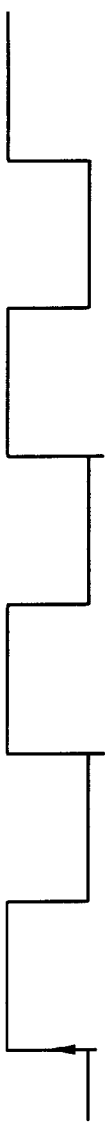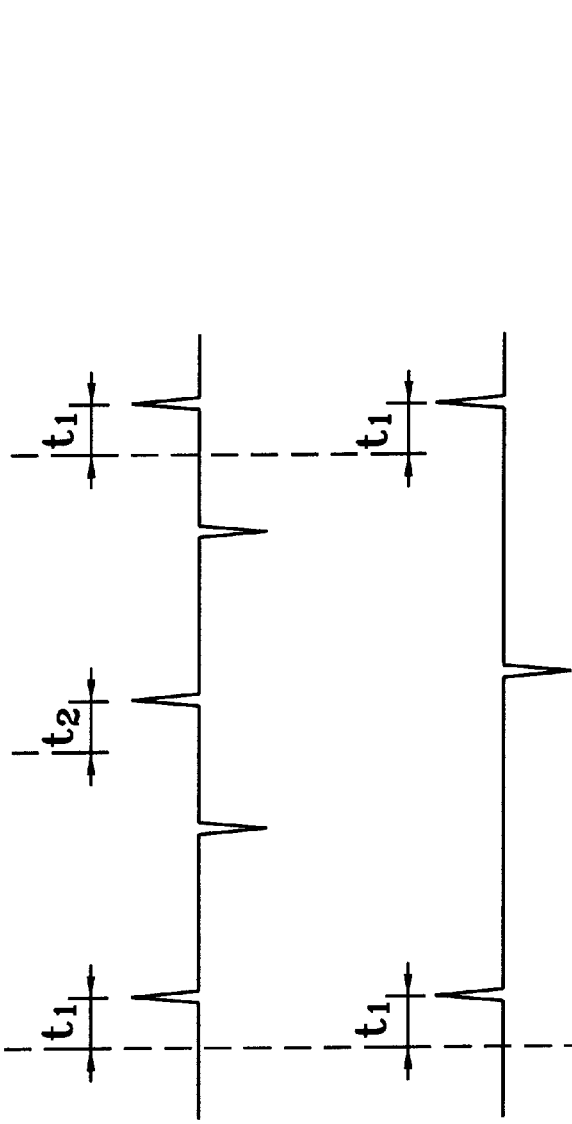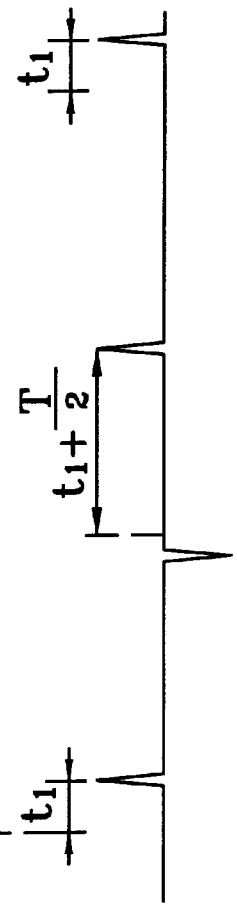
FIG. 2A HD-SW
FIG. 2B PB CTL ($t_1 = t_2$)
FIG. 2C 1/2 CTL
FIG. 2D 2/3 CTL

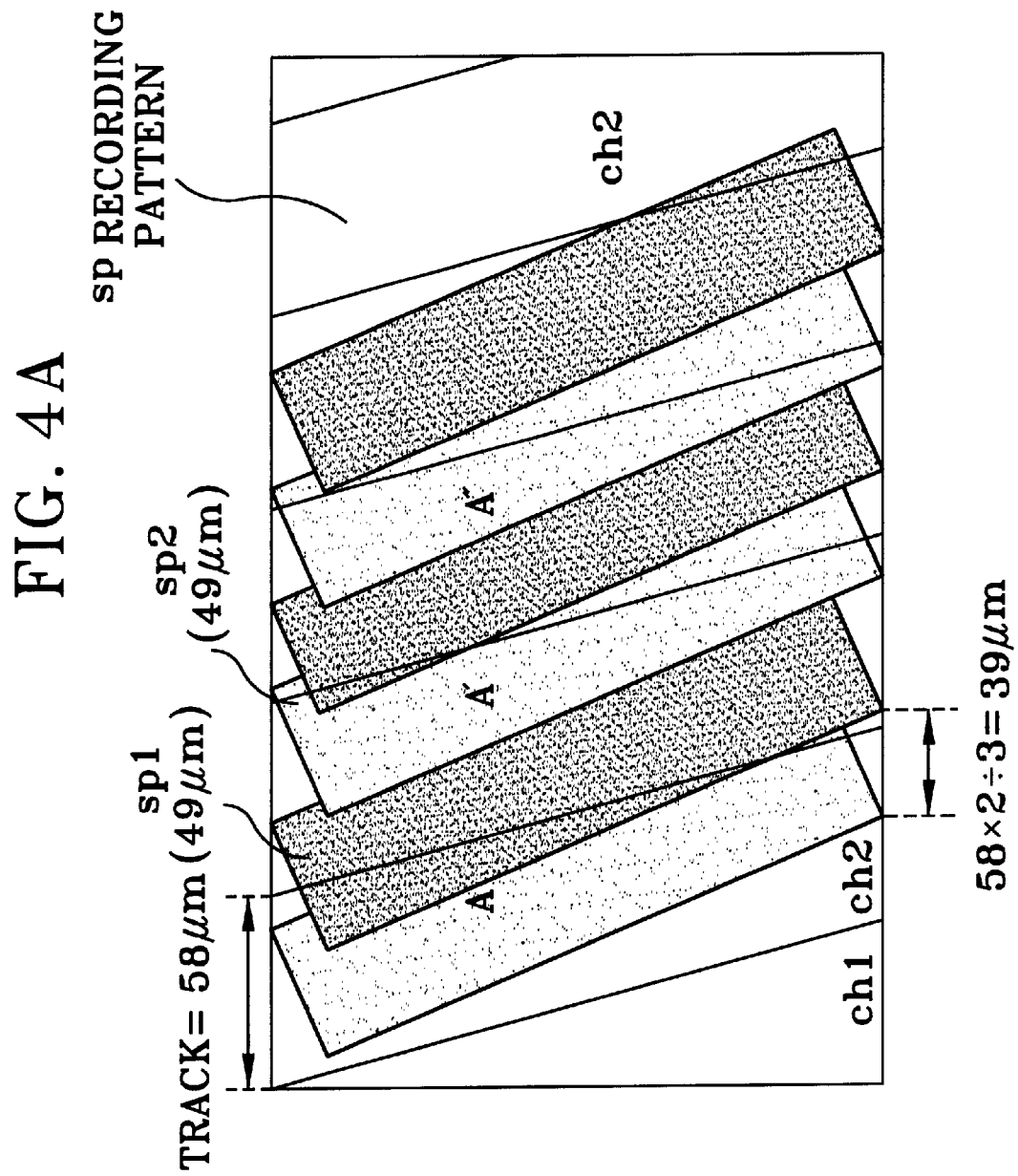

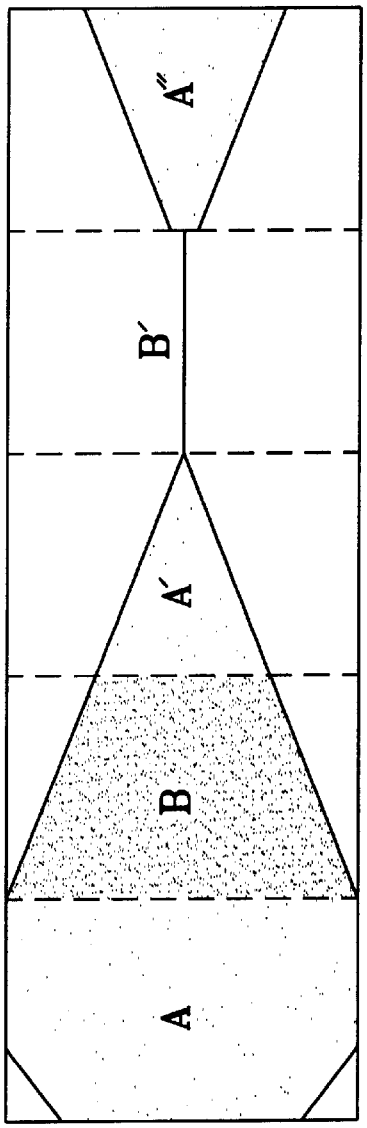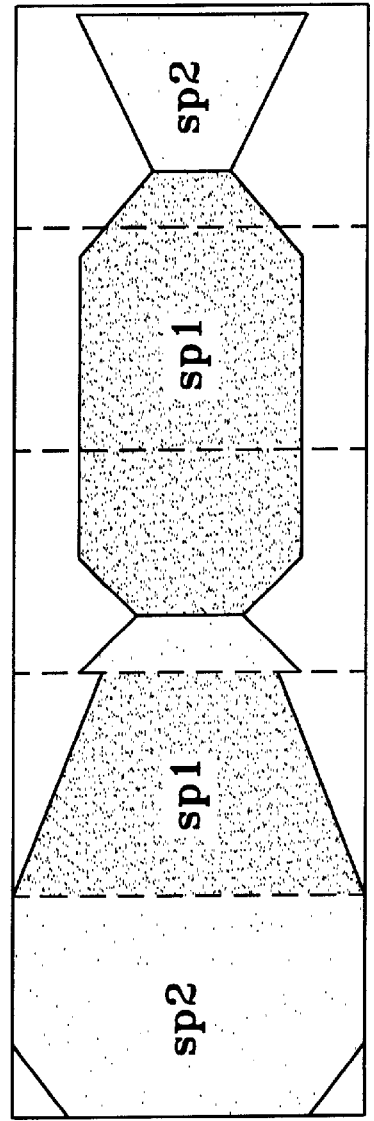
FIG. 4B
FIG. 4C

CAPSTAN PHASE CONTROL METHOD DURING SLOW PLAYBACK AND SERVO SYSTEM FOR VIDEO CASSETTE RECORDER ADOPTING THE SAME

BACKGROUND OF THE INVENTION

The present invention relates to a method for controlling a capstan phase during slow playback and a servo system for a video cassette recorder (VCR) adopting the same, and more particularly, to a method for controlling a capstan phase during slow playback and a servo system for a video cassette recorder (VCR) adopting the same in which a slow motion image can be clearly viewed without noise during slow playback in the VCR.

A servo system for use in a VCR includes a drum servo for controlling the rotational speed of a head to be constant and a capstan servo for controlling a track and maintaining a tape speed to be constant. The capstan servo controls the phase and speed of a capstan motor so that a head can accurately travel over a particular track, and maintains a tape speed to be constant according to a reproduction or recording mode.

A capstan speed control means controls rotation of a capstan motor by obtaining a capstan speed error voltage from a capstan frequency signal corresponding to a tape speed. During abnormal speed playback such as slow playback, a pause and a selective playback operation, a step slow control voltage output from a microcomputer is applied to a capstan speed control voltage.

During reproduction, a capstan phase controller controls a capstan motor by the procedure which compares the frequency of a control signal recorded on a control track of a tape with a reference frequency to thereby obtain a capstan phase error voltage, and adds the obtained capstan phase error voltage to a capstan speed control voltage.

However, the above conventional VCR controls a capstan speed by using a step slow method which makes a capstan motor repetitively rotate and stop during slow playback, with a result that an image is discontinuously displayed. For this reason, a slow motion image which can be seen from a general TV or movie cannot be provided. Also, since a control signal which becomes a reference during reproduction is irregularly read from a tape, the phase of a capstan motor cannot be controlled, and thereby produces noise on a screen.

SUMMARY OF THE INVENTION

To solve the above problems, it is an object of the present invention to provide a method for controlling the phase of a capstan motor by setting a sampling frequency so that a control signal having a frequency and phase appropriate for a slow playback mode which is used on the basis of a head switching signal is generated, and by using the set sampling frequency, with a result that a slow motion image can be clearly viewed without noise during slow playback in a VCR.

It is another object of the present invention to provide a servo system for a VCR which controls the phase and speed of a capstan motor to thereby enable a tracking control, by adopting a capstan phase control method during slow playback.

To accomplish the above object of the present invention, there is provided a method for controlling a phase of a capstan motor during slow playback in a VCR, the capstan phase control method comprising the steps of:

(a) generating a reference control signal having a frequency and phase corresponding to desired slow playback on the basis of a head switching signal; (b) reading a control signal from a tape according to corresponding slow playback; (c) judging whether the phase of the reference control signal generated in the step (a) is the same as that of the control signal read in the step (b); (d) calculating a phase error to make the phase of the read control signal coincide with that of the reference control signal on the basis of the judgement result of the step (c); and (e) controlling a capstan motor using the phase error calculated in the step (d).

There is also provided a servo system for a VCR comprising:

a capstan motor; speed error calculation means for calculating a capstan speed error by comparing an actual speed of the capstan motor with target speed corresponding to desired slow playback on the basis of a received capstan frequency signal; phase error calculation means for generating a reference control signal having a frequency and phase corresponding to desired slow playback on the basis of a head switching signal, judging whether the phase of the generated reference control signal is identical with that of a received control signal, and calculating a capstan phase error so as to make the phase of the received control signal coincide with that of the reference control signal on the basis of the judgement result; and control means for controlling the phase and speed of the capstan motor by summing the calculated capstan phase error and the calculated capstan speed error.

BRIEF DESCRIPTION OF THE DRAWINGS

The preferred embodiment is described with reference to the drawing wherein:

FIG. 2A is a waveform view of a head switching signal, and FIGS. 2B through 2D are waveform views of control signals during normal, ½ and ⅔ slow playback, respectively;

FIG. 4A shows a head trace on tape during ⅔ slow playback, and FIGS. 4B and 4C show envelope waveforms of a signal read by a head during use of two heads and four heads, respectively.

DETAILED DESCRIPTION OF THE PREFERRED EMBODIMENT

A preferred embodiment of the present invention will be described in detail with reference to the accompanying drawings.

Figure 1:
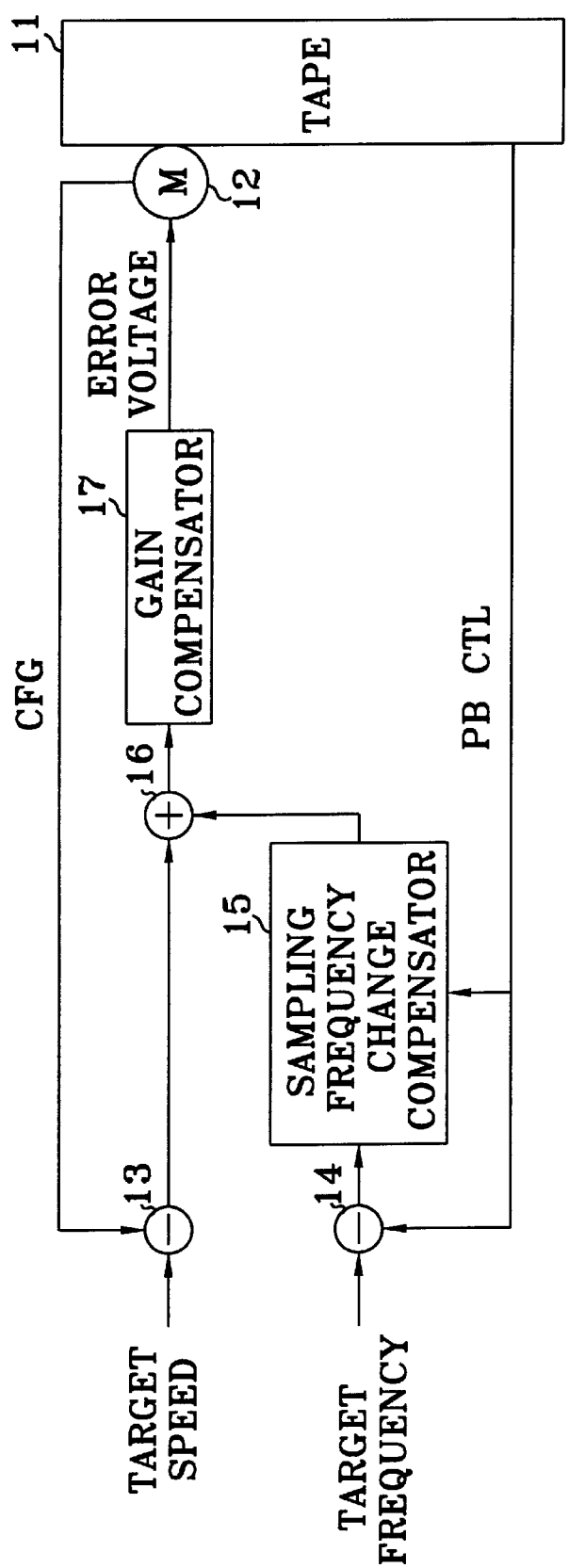
FIG. 1 is a block diagram showing a capstan servo system of a VCR to which a capstan phase control method is employed during slow playback according to the present invention.

A capstan servo system shown in FIG. 1, includes constructional blocks of a general capstan servo system for controlling the phase and speed of a capstan motor 12. The capstan servo system of FIG. 1 further includes a sampling frequency change compensator 15 disposed between a phase error calculator 14 and an adder 16, for setting a sampling frequency so that a reference control signal having a frequency and a phase appropriate for a slow playback mode used on the basis of a head switching signal, and for generating a phase error on the basis of the difference between a phase of the reference control signal having the set sampling frequency and a phase of a control signal read from tape 11.

When a VCR operates at a slow playback speed such as ½ or ⅔ of a normal playback speed, a target speed of a capstan is set ½ or ⅔ of a normal playback speed. The capstan motor 12 rotates at the set target speed during desired slow playback, and transfers the tape 11 at a low speed of ½ or ⅔ of the normal playback speed. Here, a frequency generator (not shown) inside the capstan motor 12 generates a frequency signal CFG representing a rotational speed of the capstan motor 12. A speed error calculator 13 receives the generated frequency signal CFG and compares an actual speed of the capstan motor 12 with the set target speed on the basis of the received frequency signal CFG, to thereby calculate a speed error.

When a drum motor (not shown) is driven, heads (not shown) trace on tracks of the tape 11 alternately according to head switching signals HD-SW shown in FIG. 2A, and read a recorded signal. A control signal is read from a control track on the tape 11. The control signal is produced using a vertical sync signal of a recording signal during recording, in order to control travelling of the tape, and is recorded on the control track on the tape 11. A control signal PB CTL having a pulse waveform as shown in FIG. 2B is read during normal playback of the VCR. The VCR phase-synchronizes a capstan motor with the control signal to perform a tape run. A positive signal of the control signal shown in FIG. 2B is generated every period of time of a head switching signal HD-SW at the time when a predetermined interval of time $t_1$, elapses from a rising edge of the head switching signal HD-SW of FIG. 2A. The phase error calculator 14 receives the generated control signal PB CTL and compares the frequency of the control signal with the set reference frequency, to thereby calculate a phase error. The calculated phase error is input to the sampling frequency change compensator 15.

Meanwhile, a control signal ½ CTL having a pulse waveform as shown in FIG. 2C is read during ½ slow playback of the VCR. A control signal shown in FIG. 2C is generated every two periods of time of a head switching signal HD-SW at the time when a predetermined interval of time $t_1$ elapses from a rising edge of the head switching signal HD-SW of FIG. 2A. During ⅔ slow playback, a control signal having a pulse waveform as shown in FIG. 2D is read. The control signal (⅔ CTL) of FIG. 2D is irregularly generated with respect to the head switching signal HD-SW of FIG. 2A. For example, the first pulse of the control signal is generated at the time when a predetermined interval of time $t_1$, elapses from a rising edge of the head switching signal HD-SW of FIG. 2A, the second pulse thereof is generated at the time when a predetermined interval of time $t_2$ ($t_2=t_1+T/2$) elapses from a next rising edge of the head switching signal HD-SW of FIG. 2A. Here, T is a period of the head switching signal HD-SW, and T/2 is 16.7 ms. Accordingly, the sampling frequency change compensator 15 sets a sampling frequency for generating a reference control signal having a frequency and phase corresponding to desired slow playback on the basis of the head switching signal HD-SW of FIG. 2A. The sampling frequency change compensator 15 sets a sampling frequency so that a reference control signal having a pulse interval as shown in FIG. 2C during ½ slow playback, is generated. The set sampling frequency becomes ½ of the sampling frequency during normal playback. The sampling frequency change compensator 15 sets a sampling frequency so that a reference control signal having a pulse interval as shown in FIG. 2D during ⅔ slow playback. The set sampling frequency becomes ⅔ of the sampling frequency during normal playback. The sampling frequency change compensator 15 judges whether the phase of the reference control signal having the set sampling frequency according to desired slow playback is identical with the phase of the control signal read from the tape 11. If it is judged that the phase of the read control signal is later than that of the reference control signal, the sampling frequency change compensator 15 calculates a phase error for accelerating the speed of the capstan motor 12, in order to make the phase of the read control signal identical with that of the reference control signal. On the contrary, if the phase of the read control signal is earlier than that of the reference control signal, the sampling frequency change compensator 15 calculates a phase error for decelerating the speed of the capstan motor 12, in order to make the phase of the read control signal identical with that of the reference control signal. The calculated phase error is input to the adder 16.

The adder 16 adds the input phase error to the speed error calculated in the speed error calculator 13, and outputs the addition result to a gain compensator 17. The gain compensator 17 compensates for the gain of the output of the adder 16 and outputs the compensation result to the capstan motor 12. The capstan motor 12 controlled by the signal supplied from the gain compensator 17 rotates at a constant low speed. As a result, the video signal read from the tape 11 can be displayed as a slow motion picture with no discontinuous portions of the picture.

Figure 3A:
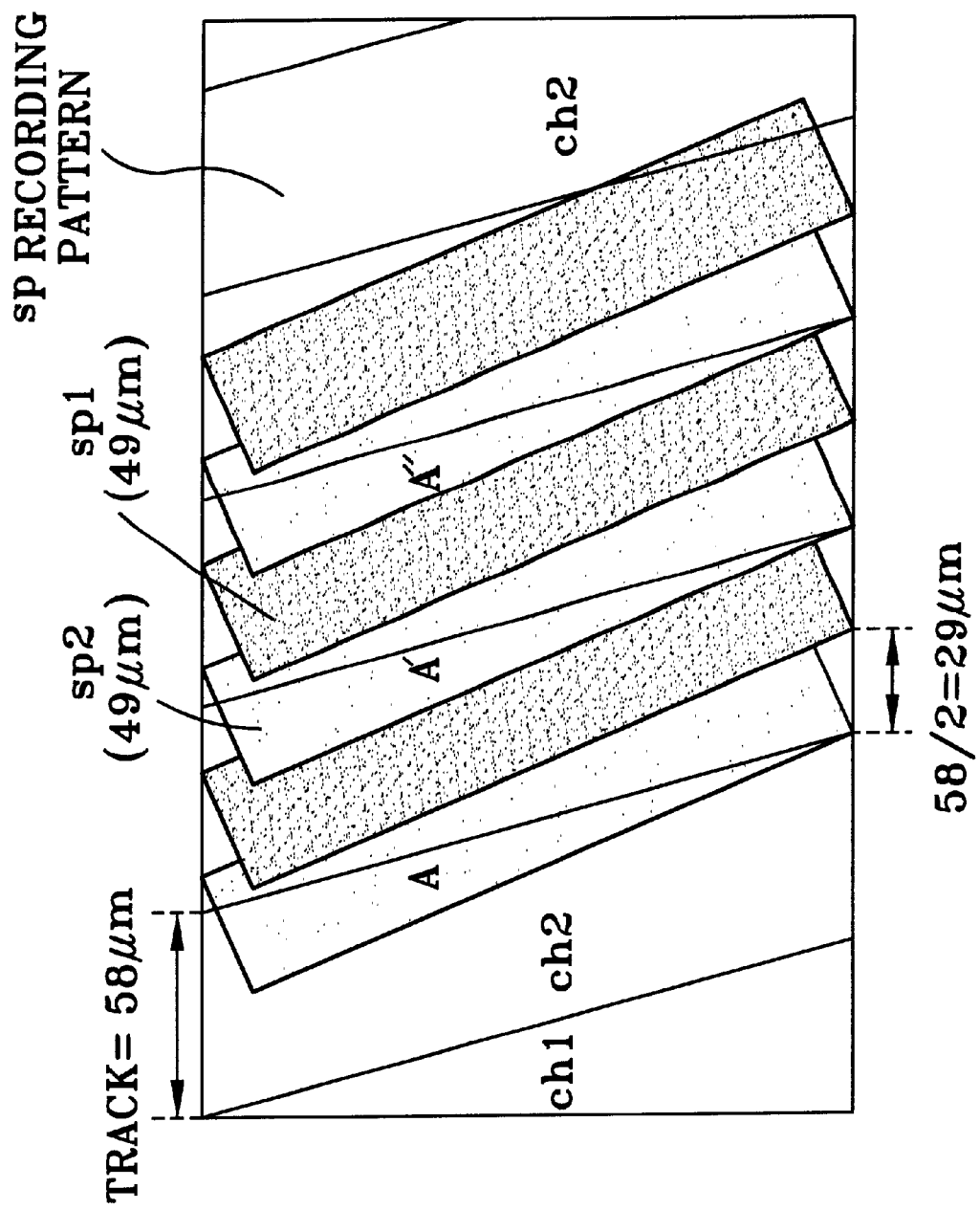
FIG. 3A shows a head trace on tape during ½ slow playback.
Figure 3B:
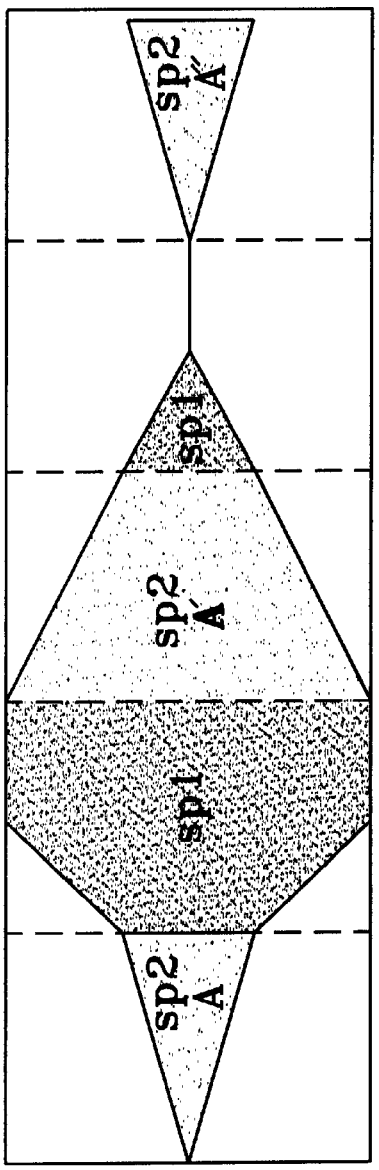
FIGS. 3B through 3C show envelope waveforms of a signal read by a head during use of two heads and four heads, respectively.
Figure 3C:
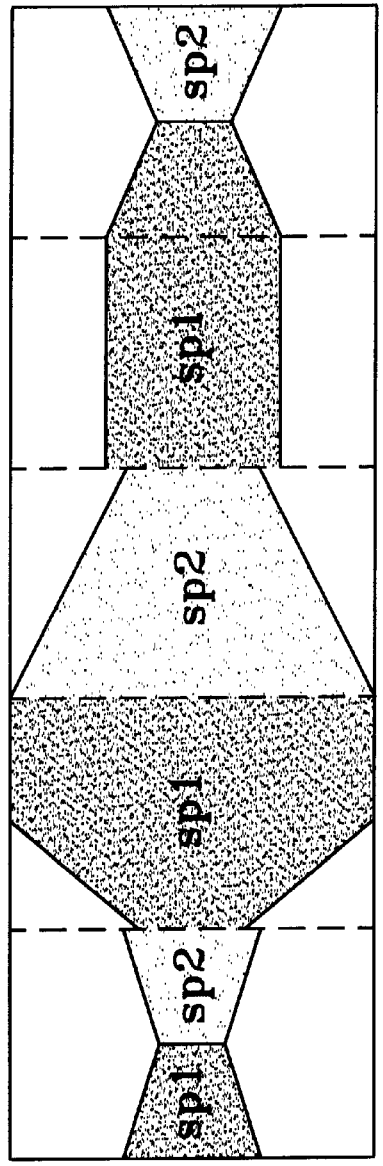

As described above, if phase control as well as speed control of the capstan motor 12 is performed during slow playback, the heads sp1 and sp2 trace tracks on the tape on which the signals are alternately recorded in a standard play (SP) mode, according to the head switching signal HD-SW of FIG. 2A during ½ slow playback, as shown in FIG. 3A. In the case where the track of the tape 11 is 58 μm in width and the head thereof is 49 μm in width, the heads alternately trace the tracks while overlapping by half (58/2=29 μm) of the width of the track and marking a locus as shown in FIG. 3A. Here, the heads trace the tracks in sequence of A, A' and A". In this case, if two heads are used, the signal read from the tape 11 has an envelope signal having a waveform of FIG. 3B. If four heads are used, the signal read from the tape 11 has an envelope signal having a waveform of FIG. 3C. On the contrary, the heads sp1 and sp2 trace tracks on the tape on which the signals are alternately recorded in a standard play (SP) mode, according to the head switching signal HD-SW of FIG. 2A during ⅔ slow playback, as shown in FIG. 4A. In the case where the track of the tape 11 is 58 μm in width and the head thereof is 49 μm in width, the heads alternately trace the tracks while overlapping by ⅔ (58/2=29 μm) of the width thereof and marking a locus as shown in FIG. 4A. Here, the heads alternately trace the tracks in sequence of A, B, A', B' and A". In this case, if two heads are used, the signal read from the tape 11 has an envelope signal having a waveform of FIG. 4B. If four heads are used, the signal read from the tape 11 has an envelope signal having a waveform of FIG. 4C. If two heads are used during ½ slow playback in the case when the phase control is not performed, much noise is generated on a screen. If four heads are used during ⅔ slow playback, less noise is generated in comparison with the use of two heads. If two heads are used during ⅔ slow playback, much stripe noise is generated on the top and bottom of the screen. If four heads are used during ⅔ slow playback, less stripe noise is generated compared with the use of two heads. However, since a phase control can be performed in the case when a signal recorded on the tape is reproduced at a low speed according to the present invention, it is apparent to a person skilled in the art that a tracking control can be performed. Thus, the servo system of the VCR can perform a tracking control which can obtain a continuous envelope signal of a predetermined size without having discontinuous portions as shown in FIGS. 32, 3C, 4B and 4C so that noise does not appear on the screen during slow playback.

As described above, the capstan phase control method during slow playback and the servo system of a VCR adopting the same according to the present invention, sets a sampling frequency corresponding to a desired slow playback speed on the basis of a head switching signal, and controls the phase of the capstan motor so that the phase of the reference control signal having the set sampling frequency is identical with that of the control signal read from the tape. Accordingly, since a tracking control can be performed, a slow motion picture without having no noise can be provided.

While only certain embodiments of the invention have been specifically described herein, it will be apparent that numerous modifications may be made thereto without departing from the spirit and scope of the invention.

What is claimed is:

1. A method for controlling a phase of a capstan motor during slow playback mode in a VCR, the capstan phase control method comprising the steps of:
   (a) generating a reference control signal having a frequency and phase corresponding to a desired slow playback speed on the basis of a head switching signals;
   (b) reading a control signal from a tape corresponding to said slow playback mode;
   (c) judging whether the phase of the reference control signal generated in the step (a) is the same as that of the control signal read in the step (b);
   (d) calculating a phase error to make the phase of the read control signal coincide with that of the reference control signal on the basis of the judgement result of the step (c); and
   (e) controlling the phase of the capstan motor using the phrase error calculated in the step (d).

2. The capstan phase control method according to claim 1, wherein said reference control signal is generated at the time when a predetermined interval of time elapses every two periods of a head switching signal during ½ slow playback.

3. The capstan phase control method according to claim 2, wherein said reference control signal has a sampling frequency during ½ slow playback, which becomes half of the sampling frequency during normal playback.

4. The capstan phase control method according to claim 1, wherein said reference control signal has a sampling frequency during ⅔ slow playback, which becomes two-thirds of the sampling frequency during normal playback.

5. The capstan phase control method according to claim 1, wherein said step (d) comprises the step of calculating the phase error to accelerate the speed of the capstan motor if the phase of the read control signal is later than that of the reference control signal.

6. The capstan phase control method according to claim 1, wherein said step (d) comprises the step of calculating the phase error to decelerate the speed of the capstan motor if the phase of the read control signal is earlier than that of the reference control signal.

7. The capstan phase control method according to claim 1, further comprising the step of:

(f) performing a tracking control on the basis of phase control of the capstan motor during slow playback.

8. The capstan phase control method according to claim 7, wherein said tracking control is performed by obtaining a continuous envelope signal of a predetermined size without having discontinuous portions.

9. A servo system for a VCR comprising:
   a capstan motor;
   speed error calculation means for calculating a capstan speed error by comparing an actual speed of the capstan motor with a target speed corresponding to a desired slow playback speed on the basis of a received capstan frequency signal;
   phase error calculation means for generating a reference control signal having a frequency and phase corresponding to said desired slow playback speed on the basis of a head switching signal, judging whether the phase of the generated reference control signal is identical with that of a received control signal, and calculating a capstan phase error so as to make the phase of the received control signal coincide with that of the reference control signal; and
   control means for controlling the phase and speed of the capstan motor by summing the calculated capstan phase error and the calculated capstan speed error.

10. The servo system according to claim 9, wherein said received control signal is a signal read from the control track on a tape according to the desired slow playback.

11. The servo system according to claim 9, wherein said phase error calculation means sets a sampling frequency so that a reference control signal having a frequency and phase corresponding to desired slow playback on the basis of the head switching signal is generated, and generates a reference control signal having the set sampling frequency.

12. The servo system according to claim 11, wherein said phase error calculation means sets the sampling frequency so that a reference control signal corresponding to ½ slow playback is generated at the time when a predetermined interval of time elapses every two periods of a head switching signal.

13. The servo system according to claim 12, wherein said phase error calculation means sets the sampling frequency of the reference control signal corresponding to ½ slow playback to half of the sampling frequency during normal playback.

14. The servo system according to claim 11, wherein said phase error calculation means sets the sampling frequency of the reference control signal corresponding to ⅔ slow playback to two-thirds of the sampling frequency during normal playback.

15. The servo system according to claim 10, wherein said phase error calculation means calculates the capstan phase error for accelerating the speed of the capstan motor in order to make the phase of the read control signal be identical with that of the reference control signal, if the phase of the read control signal is later than that of the reference control signal.

16. The servo system according to claim 10, wherein said phase error calculation means calculates the capstan phase error for decelerating the speed of the capstan motor, in order to make the phase of the read control signal be identical with that of the reference control signal if the phase of the read control signal is earlier than that of the reference control signal.

17. The servo system according to claim 9, wherein said control means comprises:
   an adder for adding the calculated capstan phase error to the calculated capstan speed error; and a gain compensator for compensating for the gain of the output of said adder and applying the compensated result to the capstan motor as an error voltage for speed and phase control.

18. The servo system according to claim 9, wherein a tracking control is performed on the basis of phase control of the capstan motor during slow playback.

19. A servo system for a VCR comprising:

a capstan motor;

speed error calculation circuit which calculates a capstan speed error by comparing an actual speed of the capstan motor with a target speed corresponding to a desired slow playback speed on the basis of a received capstan frequency signal;

phase error calculation circuit which generates a reference control signal having a frequency and phase corresponding to said desired slow playback speed on the basis of a head switching signal, judges whether the phase of the generated reference control signal is identical with that of a received control signal, and calculates a capstan phase error so as to make the phase of the received control signal coincide with that of the reference control signal; and controller which controls the phase and speed of the capstan motor by summing the calculated capstan phase error and the calculated capstan speed error.

* * * * *